(12) United States Patent
Tanaka

(10) Patent No.: US 10,918,986 B2
(45) Date of Patent: Feb. 16, 2021

(54) FILTER ELEMENT

(71) Applicant: SMC CORPORATION, Chiyoda-ku (JP)

(72) Inventor: Takayuki Tanaka, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 183 days.

(21) Appl. No.: 16/080,604

(22) PCT Filed: Jan. 27, 2017

(86) PCT No.: PCT/JP2017/002861
§ 371 (c)(1),
(2) Date: Aug. 28, 2018

(87) PCT Pub. No.: WO2017/150027
PCT Pub. Date: Sep. 8, 2017

(65) Prior Publication Data
US 2019/0054410 A1 Feb. 21, 2019

(30) Foreign Application Priority Data
Mar. 1, 2016 (JP) ................................. 2016-039188

(51) Int. Cl.
*B01D 46/24* (2006.01)
*B01D 46/52* (2006.01)
(Continued)

(52) U.S. Cl.
CPC ..... *B01D 46/2414* (2013.01); *B01D 46/0021* (2013.01); *B01D 46/103* (2013.01);
(Continued)

(58) Field of Classification Search
CPC ............ B01D 46/0021; B01D 46/0024; B01D 46/103; B01D 46/24; B01D 46/2414; B01D 46/52; B01D 2265/06
See application file for complete search history.

(56) References Cited

U.S. PATENT DOCUMENTS 4,632,682 A * 12/1986 Erdmannsdorfer ......................... B01D 46/0024
210/315
4,878,930 A 11/1989 Manniso et al.
(Continued)

FOREIGN PATENT DOCUMENTS

GB 2261830 A * 6/1993 ............. B01D 46/24
JP 59-20818 U 2/1984
(Continued)

OTHER PUBLICATIONS

International Search Report dated May 9, 2017, in PCT/JP2017/002861 filed Jan. 27, 2017.

*Primary Examiner* — Jason M Greene
(74) *Attorney, Agent, or Firm* — Oblon, McClelland, Maier & Neustadt, L.L.P.

(57) ABSTRACT

An upper end cap is attached to an upper end portion of a filter assembly, and the upper end cap includes an inner peripheral wall that is fitted into a central space portion of an inner-filter member, an intermediate wall that surrounds the outer periphery of an outer-core member, and an outer peripheral wall that surrounds the outer periphery of an outer-filter member. The height of the intermediate wall is smaller than the height of the outer peripheral wall and the height of the inner peripheral wall. The inside of the upper end cap is filled with adhesive having a depth that enables the intermediate wall to be embedded in the adhesive, and
(Continued)

the upper end portion of the filter assembly is bonded to the upper end cap in a state where the upper end portion is inserted in the adhesive.

8 Claims, 13 Drawing Sheets

(51) Int. Cl.
  *B01D 46/00*     (2006.01)
  *B01D 46/10*     (2006.01)

(52) U.S. Cl.
  CPC ............ *B01D 46/24* (2013.01); *B01D 46/52* (2013.01); *B01D 46/523* (2013.01); *B01D 2265/06* (2013.01)

(56) References Cited

U.S. PATENT DOCUMENTS

| | | | |
|---|---|---|---|
| 5,919,279 A | 7/1999 | Merritt et al. | |
| 6,093,231 A * | 7/2000 | Read | B01D 46/0024 55/498 |
| 6,536,600 B1 * | 3/2003 | Nieuwland | B01D 27/02 210/352 |
| 2006/0213162 A1 * | 9/2006 | Jodi | B01D 46/2411 55/486 |
| 2007/0186526 A1 * | 8/2007 | Lane | B01D 46/2414 55/486 |
| 2007/0240394 A1 | 10/2007 | Ehrenberg | |
| 2012/0055126 A1 | 3/2012 | Whittier et al. | |
| 2014/0151282 A1 * | 6/2014 | Brown | B01D 46/2407 210/232 |
| 2014/0157738 A1 * | 6/2014 | Eberle | B01D 46/0024 55/482 |

FOREIGN PATENT DOCUMENTS

| | | |
|---|---|---|
| JP | 60-9524 U | 1/1985 |
| JP | 60-500803 A | 5/1985 |
| JP | 60-166020 U | 11/1985 |
| JP | 61-8111 A | 1/1986 |
| JP | 61-125314 U | 8/1986 |
| JP | 7-501479 A | 2/1995 |
| JP | 11-276834 A | 10/1999 |
| JP | 2003-505228 A | 2/2003 |
| JP | 2009-534176 A | 9/2009 |
| WO | WO 84/04050 A1 | 10/1984 |
| WO | WO 93/10881 A1 | 6/1993 |

* cited by examiner (a)

FILTER ELEMENT

TECHNICAL FIELD

The present invention relates to a filter element that is used in a pneumatic filter for removing dust, a liquid, and the like mixed in compressed air.

BACKGROUND ART

When a pneumatic actuator such as a pneumatic cylinder or a pneumatic motor is operated by using compressed air, it is required to use clean compressed air in which dust and a liquid such as oil or water are not mixed. Accordingly, in order to remove foreign substances such as dust and a liquid from compressed air, for example, a pneumatic filter such as that disclosed in Patent Literature 1 is usually used in a pneumatic circuit that supplies the compressed air to the pneumatic actuator. This pneumatic filter includes a hollow filter element for removing foreign substances that is disposed in a filter case having an inlet and an outlet.

In general, a filter element of the related art has a configuration such as that illustrated in FIG. 16 and FIG. 17. A filter element 40 is formed by fixing end caps 46 and 47 onto an upper end and a lower end of a filter assembly 41, respectively, with adhesive 49, the filter assembly 41 being formed of two filter elements, which are a hollow inner-filter element 42 and a hollow outer-filter element 43 whose porosities are different from each other, and two core members, which are a cylindrical inner-core member 44 and a cylindrical outer-core member 45 each of which is formed of a perforated metal, that are alternately arranged coaxially with one another.

The inner filter member 42, which is one of the two filter members, is formed by rolling a filter that is folded in a pleated manner into a cylindrical shape while the filter is in a position in which the folds thereof are oriented parallel to a central axis L. In contrast, the outer filter member 43 is formed by rolling a filter having a flat plate-like shape and a uniform thickness into a cylindrical shape.

In the filter element 40, when compressed air is supplied to a hollow portion 48 located at the center of the filter element 40 through the upper end cap 46, the compressed air is filtered while passing from the inner filter member 42 toward the outer filter member 43 as illustrated in FIG. 16 and is purified as a result of the foreign substances being removed therefrom.

Small particles of the liquid, such as oil or water, that has been separated from the compressed air gradually grow into large liquid particles by repeatedly bonding to one another while the liquid flows down along the filter members 42 and 43. After flowing down to the lower end cap 47, the liquid successively falls in drops from the lower end cap 47 into the filter case and is discharged as a drain from a drain discharge port at a lower end portion of the filter case.

However, in the filter element 40 of the related art, there has been a problem in that, when compressed air flows at a high velocity, the liquid densely included in the filter members 42 and 43 and the liquid collected in the lower end cap 47 are dispersed by coming into contact with the compressed air, which flows at a high velocity, in the vicinities of, for example, lower end portions of the filter members 42 and 43 and a top surface the lower end cap 47 and mixed again into the compressed air that has been purified.

Accordingly, in order to solve such a problem, the applicant has proposed, in Japanese Patent Application No. 2015-096629, a filter element capable of preventing a liquid collected by a filter member from being mixed again, at a lower end portion of the filter element, into compressed air that has been purified.

However, it was found from the subsequent experiment and the like that the problem of redispersion of the liquid occurred not only at the lower end portion of the filter element 40 but also at an upper end portion of the filter element 40. That is to say, as illustrated in FIG. 18, when the upper end cap 46 is bonded to the upper end of the filter assembly 41 with the adhesive 49, a recess 50 is partially formed due to uneven distribution of the adhesive 49. A puddle of the liquid is formed in the recess 50 because the flow of the air is slow in the vicinity of a surface of the adhesive 49, and part of the liquid collected by the filter members 42 and 43 stays in the recess 50. A liquid 51 staying in the recess 50 gradually agglomerates and increases the volume and the weight thereof, and then, the liquid 51 gradually flows down and comes into contact with the air flowing fast, so that the liquid 51 penetrates into the outer filter member 43. After reaching the outer peripheral surface of the outer filter member 43, the liquid 51 is dispersed from the outer peripheral surface into the air again.

The reason why the recess 50 is formed is presumed to be that, when the upper end cap 46 is bonded to the upper end of the filter assembly 41 with the adhesive 49, the adhesive 49 that flows as a result of being pushed by the filter members 42 and 43, the core members 44 and 45, and the like is unlikely to enter a narrow gap and thus is not uniformly distributed.

In other words, when the upper end cap 46 is bonded to the upper end of the filter assembly 41, as illustrated in FIG. 19a, a certain amount (depth) of the adhesive 49 having a viscosity is injected into the upper end cap 46 that has been turned upside down, and an upper end portion of the filter assembly 41 that faces downward is inserted into the adhesive 49 as illustrated in FIG. 19b and FIG. 19c. After that, the adhesive 49 is cured, and in this case, the adhesive 49 is pushed by the filter members 42 and 43, the core members 44 and 45, and the like. As a result, as illustrated in FIG. 19b, the adhesive 49 flows within the upper end cap 46 in the direction toward the inner periphery of the upper end cap 46, in the direction toward the outer periphery of the upper end cap 46, in the circumferential direction of the upper end cap 46, and the like and also flows in such a manner as to gradually protrude in the direction in which the axis L extends (a depth direction), and at the same time, the adhesive 49 enters gaps formed between the inner filter member 42 that is folded in a pleated manner and also penetrates into the outer filter member 43. Only a small amount of the adhesive 49 penetrates into the inner filter member 42 having a low porosity.

In this case, as illustrated in FIG. 17, the adhesive 49 is likely to enter a gap having a large size among the gaps formed between folded pieces 42a and 42a of the inner filter member 42 that are continuous with one another in a pleated manner, a large gap between the inner-core member 44 and a cylindrical portion 46a of the upper end cap 46, or the inside of the outer filter member 43 having a low porosity and the like because there is only a small resistance in each of these regions. However, the adhesive 49 is less likely to enter a narrow gap between the folded pieces 42a and 42a, narrow gaps between folds 42b of the pleats and the core members 44 and 45, and the like because there is a large resistance in each of these regions. In a region where a large amount of the adhesive 49 has entered, the adhesive 49 protrudes high. As a result, as illustrated in FIG. 18, the recess 50 is partially formed due to uneven distribution of the adhesive 49, and it is assumed that a puddle of the liquid will be formed in the recess 50, which in turn causes redispersion of the liquid.

CITATION LIST

Patent Literature

PTL 1: Japanese Unexamined Utility Model Registration Application Publication No. 60-166020

SUMMARY OF INVENTION

Technical Problem

It is a technical object of the present invention to provide a filter element having a structure in which uneven distribution of an adhesive will not be generated when an upper end cap is bonded to an upper end portion of a filter assembly with the adhesive, so that redispersion of liquid will not occur at the upper end portion.

Solution to Problem

To solve the above problem, a filter element according to the present invention is a filter element having a hollow shape and for removing dust and a liquid mixed in compressed air and includes a filter assembly that has a hollow shape; an upper end cap that is attached to an upper end of the filter assembly, which is one of ends of the filter assembly in an axial direction; and a lower end cap that is attached to a lower end of the filter assembly that is opposite to the upper end of the filter assembly. The filter assembly includes a central space portion into which compressed air is introduced, a hollow inner-core member that has a porous structure and that surrounds the central space portion, a hollow inner-filter member that surrounds an outer periphery of the inner-core member, a hollow outer-core member that has a porous structure and that surrounds an outer periphery of the inner-filter member, and a hollow outer-filter member that surrounds an outer periphery of the outer-core member. The upper end cap includes a hollow inner peripheral wall that is fitted into an upper end portion of the central space portion, an intermediate wall that surrounds an outer periphery of an upper end portion of the outer-core member, and an outer peripheral wall that surrounds an outer periphery of an upper end portion of the outer-filter member, the inner peripheral wall, the intermediate wall, and the outer peripheral wall being arranged in this order in a direction from the center of the upper end cap toward an outer periphery of the upper end cap. A height of the intermediate wall is smaller than a height of the outer peripheral wall and a height of the inner peripheral wall. The inside of the upper end cap is filled with an adhesive having a depth that enables the intermediate wall to be embedded in the adhesive. The filter assembly and the upper end cap are bonded to each other in a state where an upper end portion of the filter assembly is inserted in the adhesive.

It is desirable that the intermediate wall be formed at a position between the outer peripheral wall and an intermediate position between the inner peripheral wall and the outer peripheral wall. A preferable height of the intermediate wall is half of the height of the outer peripheral wall or smaller.

In addition, in the present invention, a lower end portion of the intermediate wall extends to a position lower than at least an upper end portion of the inner-core member, an upper end portion of the inner-filter member, and the upper end portion of the outer-core member among the inner-core member, the inner-filter member, the outer-core member, and the outer-filter member of the filter assembly. It is preferable that the lower end portion of the intermediate wall be located at a position lower than the upper end portion of the outer-filter member and dig into the outer-filter member.

Furthermore, in the present invention, it is desirable that the inner-filter member be folded in a pleated manner.

In the present invention, the intermediate wall may be continuous along a whole periphery or may be formed in a discontinuous state by arranging a plurality of wall portions such that the plurality of wall portions are spaced apart from one another. Alternatively, the intermediate wall may be formed of a plurality of annular walls having different diameters so as to have a multiple structure.

Advantageous Effects of Invention

According to the present invention, an upper end cap is provided with an intermediate wall, so that when the upper end cap is bonded and fixed to an upper end portion of a filter assembly with an adhesive, that is, when the upper end portion of the filter assembly is inserted into the adhesive with which the upper end cap has been filled so as to be bonded to the upper end cap, the free flow of the adhesive is restricted by the intermediate wall, and as a result, distribution of the adhesive is made uniform. Thus, unlike the related art, a recess will not be formed due to uneven distribution of the adhesive, and a puddle of liquid will not be formed in such a recess. As a result, a problem in that liquid particles collected by a filter member are dispersed again by coming into contact with air flow after temporarily staying in the recess is solved.

BRIEF DESCRIPTION OF DRAWINGS

FIG. 7(a), FIG. 7(b), and FIG. 7(c) are respectively a diagram illustrating a state before the bonding process is performed, a diagram illustrating a state during the bonding process, and a diagram illustrating a state immediately before the bonding process is completed.

FIG. 13(a) and FIG. 13(b) are respectively a bottom view and a sectional view.

FIG. 15(a) and FIG. 15(b) are respectively a perspective view and a sectional view.

FIG. 19(a), FIG. 19(b), and FIG. 19(c) are respectively a diagram illustrating a state before the bonding process is performed, a diagram illustrating a state during the bonding process, and a diagram illustrating a state immediately before the bonding process is completed.

DESCRIPTION OF EMBODIMENTS

Figure 1:
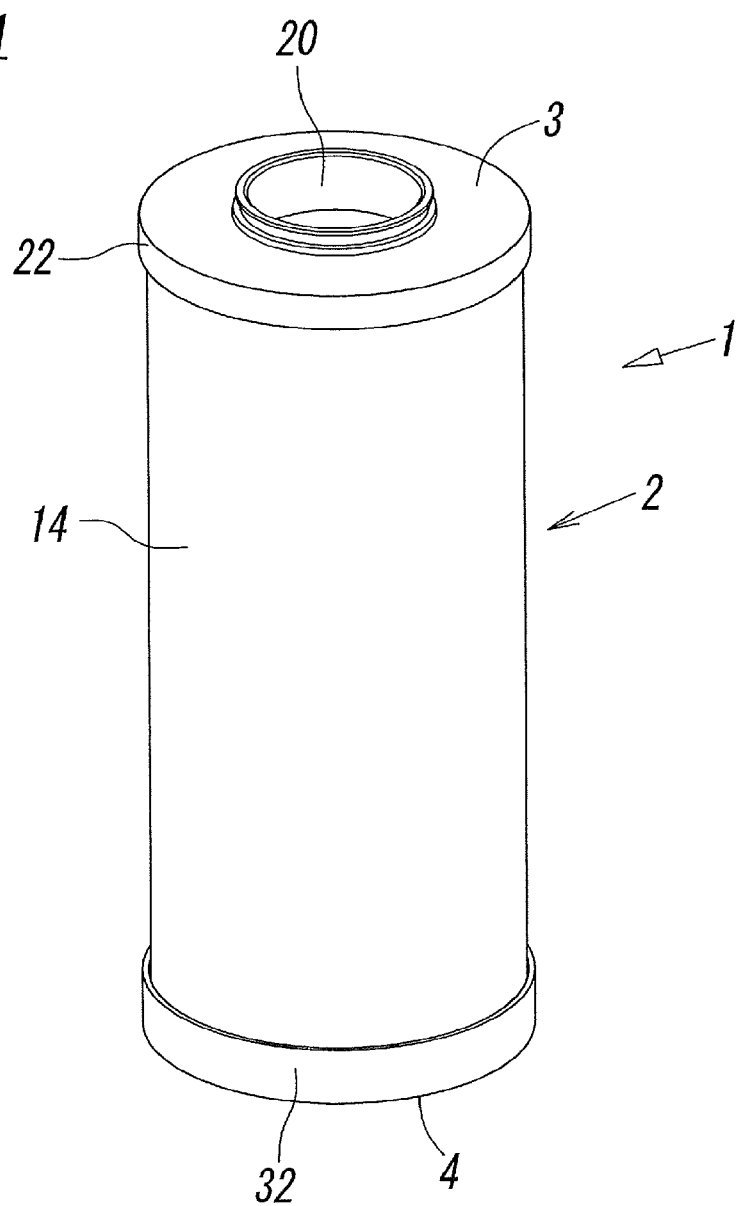
FIG. 1 is a perspective view illustrating an embodiment of a filter element according to the present invention.
Figure 2:
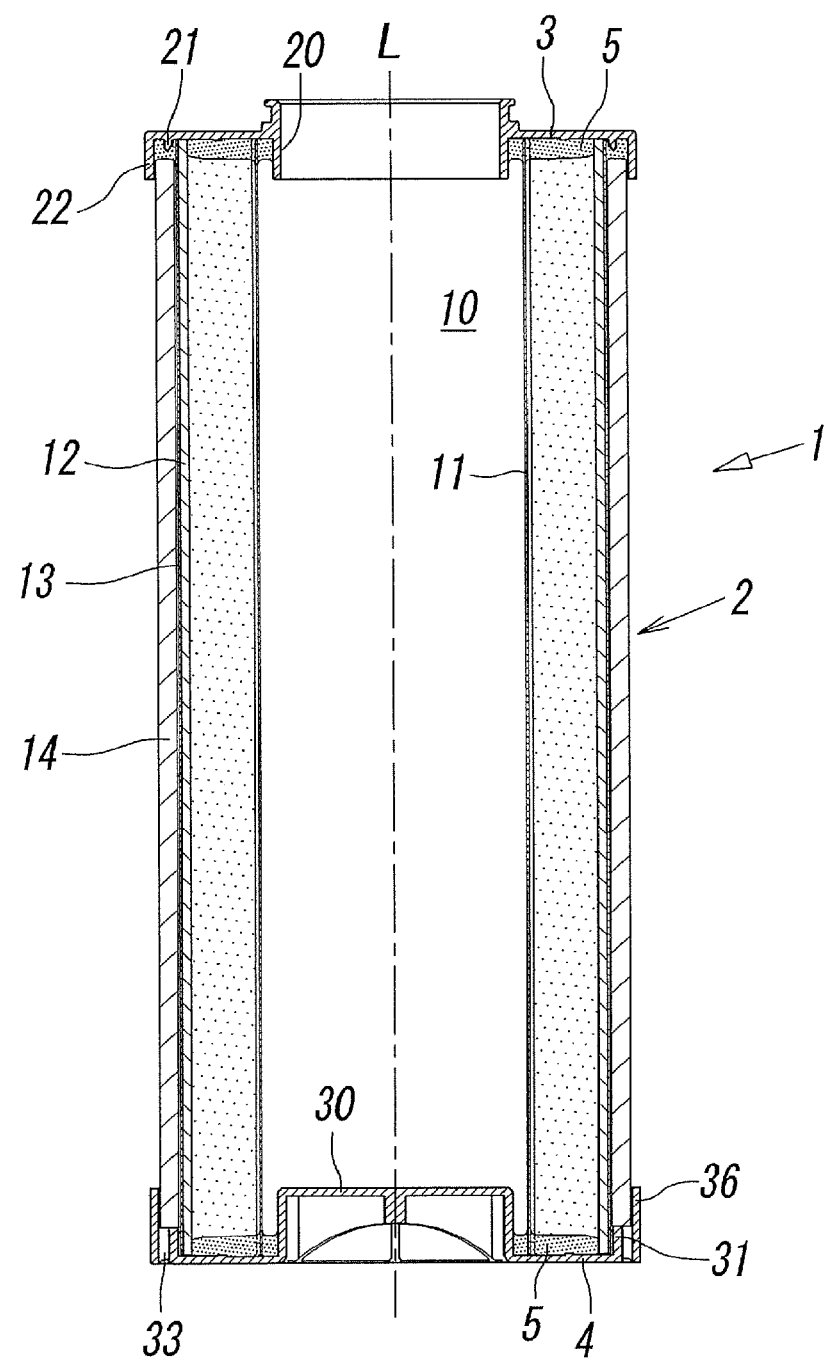
FIG. 2 is a longitudinal sectional view of the filter element illustrated in FIG. 1.
Figure 3:
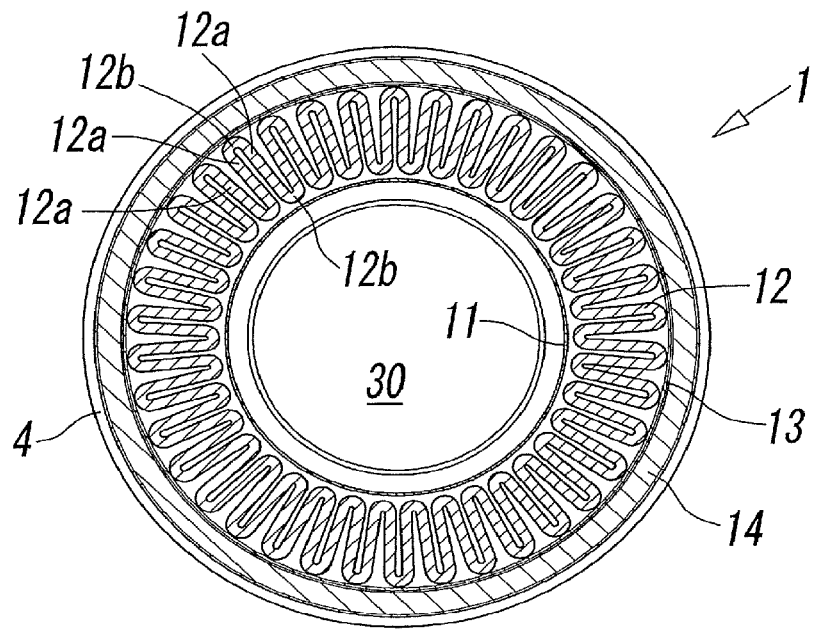
FIG. 3 is a transverse sectional view of the filter element illustrated in FIG. 1.

FIGS. 1 to 3 illustrate a filter element 1 according to the present invention. The filter element 1 includes a hollow filter assembly 2, an upper end cap 3 that has an annular shape and that is attached to an upper end of the filter assembly 2, which is one of the ends of the filter assembly 2 in a direction in which an axis L extends, and a lower end cap 4 that has a circular dish-like shape and that is attached to a lower end of the filter assembly 2, which is the other of the ends of the filter assembly 2.

The filter assembly 2 includes a central space portion 10 into which compressed air is introduced, a hollow inner-core member 11 that has a porous structure and that surrounds the central space portion 10, a hollow inner-filter member 12 that surrounds the central space portion 10 with the inner-core member 11 interposed therebetween, a hollow outer-core member 13 that has a porous structure and that surrounds the outer periphery of the inner-filter member 12, and a hollow outer-filter member 14 that surrounds the outer periphery of the outer-core member 13. The compressed air introduced into the central space portion 10 of the filter assembly 2 through a hollow inner peripheral wall 20 of the upper end cap 3 is filtered while passing from the inner-filter member 12 toward the outer-filter member 14, and the compressed air that has been purified as a result of a liquid such as oil or water and dust being removed therefrom flows out from the outer-filter member 14 to the outside.

The inner-core member 11 and the outer-core member 13 are each formed by rolling a perforated metal into a cylindrical shape and serve to maintain the strength of the filter assembly 2. Note that the inner-filter member 12 and the outer-filter member 14 also each have a cylindrical shape.

The inner-filter member 12 is positioned further upstream than the outer-filter member 14 in a direction in which the compressed air flows and mainly collects dust and a liquid, such as oil or water in the form of mist or liquid droplets, contained in the compressed air. The inner-filter member 12 is formed by rolling a filter that is folded in a pleated manner into a cylindrical shape, and the inner-filter member 12 is disposed between the inner-core member 11 and the outer-core member 13 in such a manner as to be in a position in which fold portions 12b are oriented parallel to the axis L.

The inner-filter member 12 includes folded pieces 12a that are continuous with one another in a pleated manner and thus has a filtration area larger than that of a member formed by rolling a flat sheet-shaped filter into a cylindrical shape.

In contrast, the outer-filter member 14 is positioned further downstream than the inner-filter member 12 in the direction in which the compressed air flows and mainly serves to guide the liquid, such as oil or water, that has been collected by the inner-filter member 12 to the lower end cap 4. The outer-filter member 14 is disposed on an outer peripheral portion of the outer-core member 13 in such a manner as to surround the outer periphery of the inner-filter member 12 with the outer-core member 13 interposed therebetween.

For example, the inner-filter member 12 and the outer-filter member 14 can each be formed of a fiber sheet that is formed by regularly or irregularly stacking fine chemical fibers each having a diameter of about several μm to about several tens μm, a piece of nonwoven fabric that is formed by joining such stacked chemical fibers with an adhesive or by using a method such as fusing or entanglement fixing, an aggregate of ceramic fine particles, a porous sheet that is made of a synthetic resin, or the like. In addition, the porosity (mesh size) of the inner-filter member 12 is reduced by using fibers each of which is smaller in diameter than the outer-filter member 14, so that the inner-filter member 12 is densely formed to such an extent that fine dust and fine mist of, for example, oil or water can be reliably collected by the inner-filter member 12. In contrast, the porosity (mesh size) of the outer-filter member 148 is increased by using fibers each of which is larger in diameter than the inner-filter member 12, so that the outer-filter member 14 is formed so as to be capable of guiding the liquid, such as oil or water, collected by the inner-filter member 12 to the lower end cap 4 promptly. Therefore, it can be said that the inner-filter member 12 is a fine-mesh filter member and that the outer-filter member 14 is a large-mesh filter member.

The upper end cap 3, which has an annular shape and is made of a synthetic resin, is fixed to an upper end portion of the inner-filter member 12 and to an upper end portion of the outer-filter member 14 with adhesive 5, and the lower end cap 4, which has an annular dish-like shape and is made of a synthetic resin, is fixed to a lower end portion of the inner-filter member 12 and to a lower end portion of the outer-filter member 14 with the adhesive 5.

Figure 4:
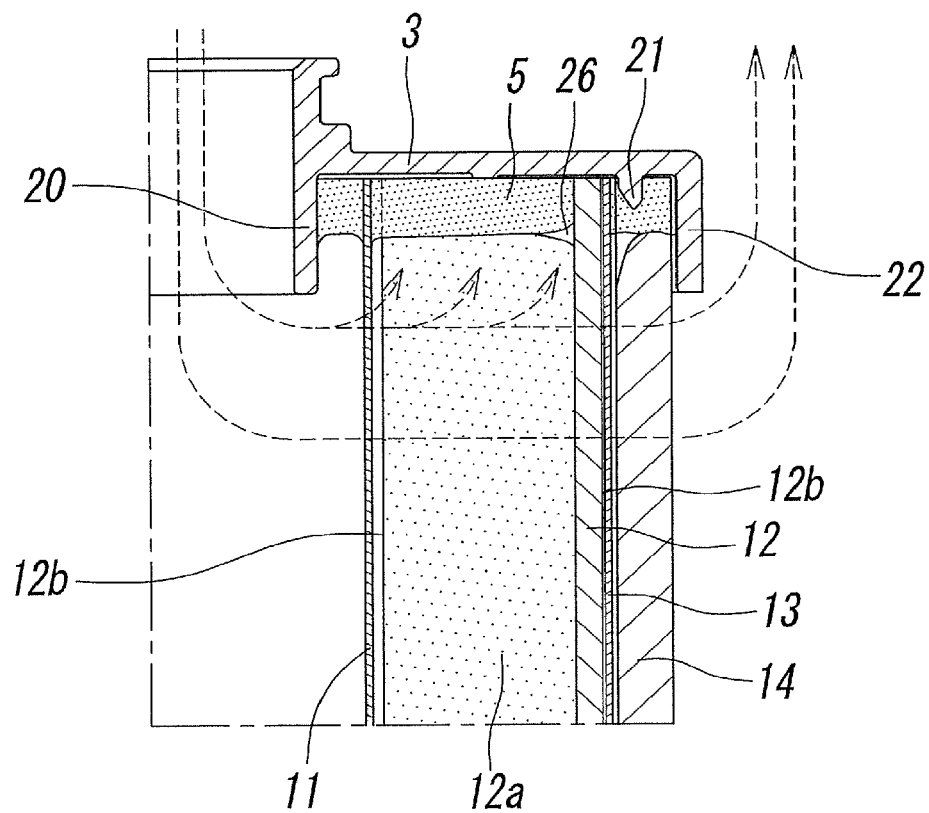
FIG. 4 is a partially enlarged view of the right half of an upper end portion of the filter element illustrated in FIG. 2.

As also seen from FIG. 4 and FIGS. 5(a) and 5(b), the upper end cap 3 integrally includes the inner peripheral wall 20 that has an annular shape and is fitted into an upper end portion of the central space portion 10, an intermediate wall 21 that has an annular shape and surrounds the outer periphery of an upper end portion of the outer-core member 13, and an outer peripheral wall 22 that has an annular shape and surrounds the outer periphery of an upper end portion of the outer-filter member 14, and these walls are arranged in this order in a direction from the center of the upper end cap 3 toward the outer periphery of the upper end cap 3. The inner peripheral wall 20, the intermediate wall 21, and the outer peripheral wall 22 extend parallel to the axis L toward the lower side of the filter element 1, that is, toward the lower end cap 4. In addition, an upper end portion of the inner peripheral wall 20 extends toward the upper side of the lower end cap 4 while having a cylindrical shape.

When the upper end cap 3 is bonded to an upper end portion of the filter assembly 2 with the adhesive 5 having a viscosity, the intermediate wall 21 serves to restrain the adhesive 5 from excessively flowing in directions toward the inner and outer peripheries of the upper end cap 3, particularly in the direction toward the outer periphery of the upper end cap 3, so as to make distribution of the adhesive 5 approximately uniform. The intermediate wall 21 is formed at a position between the outer peripheral wall 22 and an intermediate point between the inner peripheral wall 20 and the outer peripheral wall 22 in such a manner as to be continuous along the whole periphery of the annular shape and so as to have a uniform height H1 along the whole periphery of the annular shape, and the cross-sectional shape of the intermediate wall 21 has a slightly sharp end (lower end).

In other words, the intermediate wall 21 has an inner side surface 21a that is parallel to the axis L, an outer surface 21b that is parallel to the axis L, an inner inclined surface 21c that extends obliquely downward from an end of the inner side surface 21a, an outer inclined surface 21d that extends obliquely downward from an end of the outer surface 21b, and a lower end surface 21e that is rounded. The inner inclined surface 21c is a surface that is inclined in a direction away from the axis L, and the outer inclined surface 21d is a surface that is inclined in a direction toward the axis L. In addition, the width of the inner side surface 21a in the vertical direction is smaller than the width of the outer surface 21b in the vertical direction, and the width of the inner inclined surface 21c in the vertical direction is larger than the width of the outer inclined surface 21d in the vertical direction. Note that the operation of the intermediate wall 21 will be described anew later.

Heights H2 of the inner peripheral wall 20 and the outer peripheral wall 22 from an inner cap surface 3a of the upper end cap 3 are substantially the same, and the height H1 of the intermediate wall 21 from the inner cap surface 3a of the upper end cap 3 is smaller than each of the heights H2 of the inner peripheral wall 20 and the outer peripheral wall 22. In general, a preferable relationship between the height H2 of the outer peripheral wall 22 and the height H1 of the intermediate wall 21 is that the height H1 of the intermediate wall 21 is half of the height H2 of the outer peripheral wall 22 or smaller. It is more preferable that the height H1 of the intermediate wall 21 be in a range of one-third to one-fifth of the height H2 of the outer peripheral wall 22, and more preferably, that the height H1 of the intermediate wall 21 be one-quarter of the height H2 of the outer peripheral wall 22. However, the preferable relationship between the height H1 of the intermediate wall 21 and the height H2 of the outer peripheral wall 22 varies depending on the viscosity of the adhesive 5, the filling amount of the adhesive 5, or the like and thus is not necessarily limited to those mentioned above.

Figure 7:
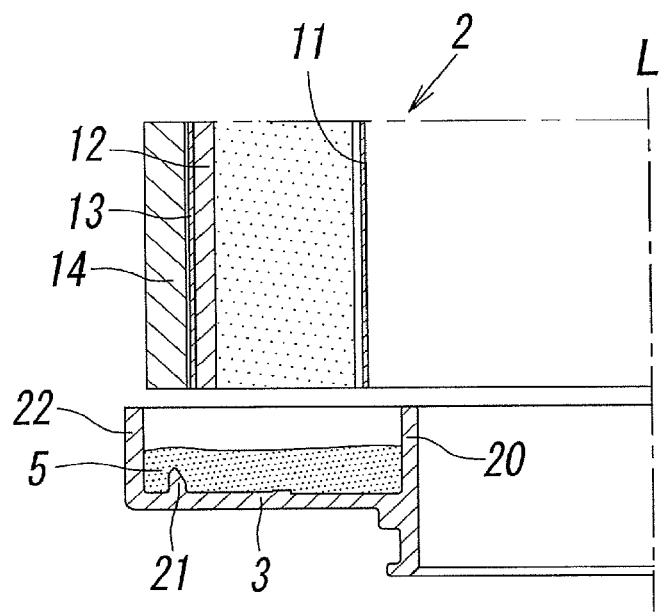
FIG. 7 are cross-sectional views of a principal portion that illustrate a process of bonding the upper end cap to the filter element with an adhesive.
Figure 7:
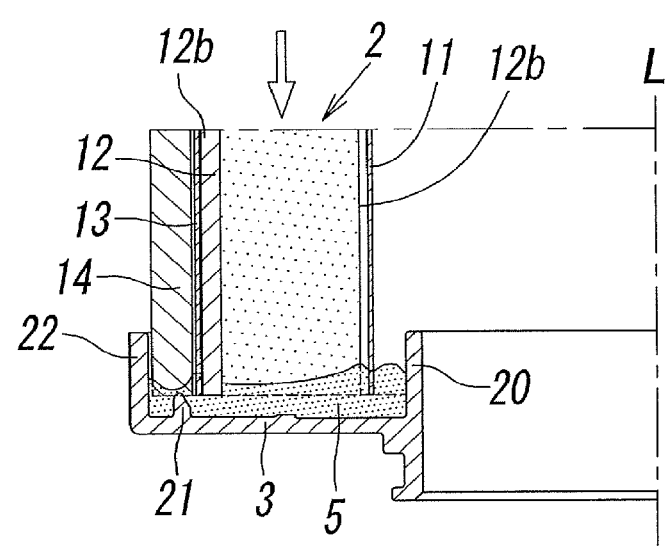
Figure 7:
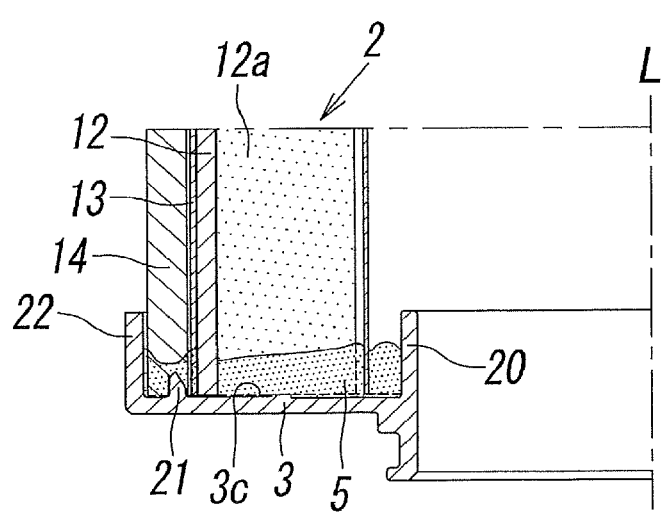

When the upper end cap 3 is bonded to the upper end portion of the filter assembly 2 with the adhesive 5, as illustrated in FIG. 7(a), the upper end cap 3 is turned upside down and maintained in a horizontal position, and the adhesive 5 having a viscosity is injected into the upper end cap 3 so as to have such a depth that the intermediate wall 21 is embedded in the adhesive 5 and that the adhesive 5 will not flow out to the outside beyond the outer peripheral wall 22 and the inner peripheral wall 20 even when the end portion of the filter assembly 2 is inserted into the adhesive 5.

As the above-mentioned adhesive, epoxy-based adhesive agents are preferably used, and among these adhesive agents, an adhesive agent obtained by mixing equal parts by weight of an epoxy resin (having a viscosity of 30,000±10,000 m (Pa·s/25° C.)), which is a main component, and modified polyamidoamine (having a viscosity of 23,000±10,000 (mPa·s/25° C.)), which is a curing agent component, is particularly preferable. The viscosity of the adhesive agent obtained in the manner described above is equivalent to the viscosity of honey that is commonly and commercially available.

Next, the filter assembly 2 is turned upside down, and the upper end portion facing downward is inserted into the adhesive 5 as illustrated in FIG. 7(b) and then inserted further into the adhesive 5 as illustrated in FIG. 7(c) such that an end of the inner-core member 11, an end of the inner-filter member 12, and an end of the outer-core member 13 are brought into contact with the inner cap surface 3a of the upper end cap 3 or such that these ends are located at positions in the vicinity of the inner cap surface 3a where a very small gap is maintained between these ends and the inner cap surface 3a with the adhesive 5 interposed therebetween. In this case, the end of the inner-core member 11, the end of the inner-filter member 12, the end of the outer-core member 13, and the end of the outer-filter member 14 are aligned so as to be located on the same plane that is perpendicular to the axis L, and thus, the lower end portion of the intermediate wall 21 occupies a position lower than the upper end portions of the members 11, 12, 13, and 14 and digs into the outer-filter member 14.

When the end portion of the filter assembly 2 is inserted into the adhesive 5 in the manner described above, the adhesive 5 that is pushed by the inner-core member 11, the inner-filter member 12, the outer-core member 13, and the outer-filter member 14 flows within the upper end cap 3 in the direction toward the inner periphery of the upper end cap 3, in the direction toward the outer periphery of the upper end cap 3, and in the circumferential direction of the upper end cap 3 and also flows in such a manner as to gradually protrude in the vertical direction (depth direction).

In this case, part of the adhesive 5 that flows in the direction toward the outer periphery of the upper end cap 3 and away from the inner-filter member 12 (that flows laterally) is interrupted by the intermediate wall 21 such that the flow thereof is restricted, and the flow direction thereof is changed to the vertical direction along the inner side surface 21a and the inner inclined surface 21c of the intermediate wall 21. As a result, the adhesive 5 reliably enters gaps including the gaps between the folded pieces 12a and 12a of the inner-filter member 12, which are continuous with one another in a pleated manner, and the gaps between the fold portions 12b and the outer-core member 13 and eventually, as illustrated in FIG. 4, is approximately uniformly distributed to spaces between the inner peripheral wall 20 and the inner-core member 11, between the inner-core member 11 and the inner-filter member 12, between the inner-filter member 12 and the outer-core member 13, between the outer-core member 13 and the outer-filter member 14, and the like. In this case, a surface of the adhesive 5 may not become a perfect flat surface and may partially undulate slightly, and a small recess 16 may sometimes be formed. However, a large recess that may be formed in the case where the intermediate wall 21 is not provided will not be formed.

Note that part of the adhesive 5 penetrates into the outer-filter member 14 having a high porosity, and only a small amount of the adhesive 5 penetrates into the inner-filter member 12 having a low porosity.

After that, the adhesive 5 is cured, so that the upper end cap 3 is bonded to the upper end portion of the filter assembly 2 and is cured. The time taken for curing is 12 hours or more at a temperature of 25° C.

The upper end cap 3 is provided with the intermediate wall 21 as described above, so that, when the upper end cap 3 is bonded and fixed to the upper end portion of the filter assembly 2 with the adhesive 5, the intermediate wall 21 restricts the flow of the adhesive 5 and changes the flow direction of the adhesive 5, and the distribution of the adhesive 5 is made uniform.

Accordingly, unlike a filter element of the related art, a recess that is not filled with an adhesive will not be formed, and a puddle of liquid will not be formed in such a recess. This solves a problem in that liquid particles collected by a filter member are dispersed again by coming into contact with compressed air after temporarily staying in the drain puddle. This matter was confirmed by repeatedly conducting various experiments on the case where the upper end cap 3 was bonded to the filter assembly 2 without forming the intermediate wall 21 and on the cases where the upper end cap 3 was bonded to the filter assembly 2 by forming the intermediate walls 21 having various shapes and heights.

Figure 6:
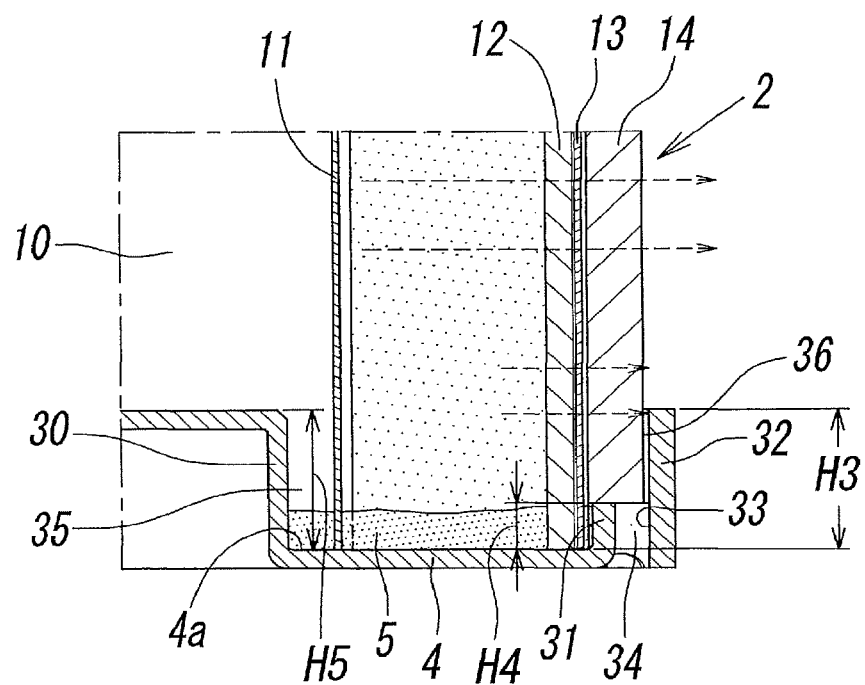
FIG. 6 is a partially enlarged view of the right half of a lower end portion of the filter element illustrated in FIG. 2.

In contrast, the lower end cap 4 closes a lower end portion of the central space portion 10 of the filter assembly 2 and includes, as is clear from FIG. 3 and FIG. 6, a columnar central protruding portion 30 that is positioned at the center of a top surface of the lower end cap 4 and is fitted into the central space portion 10, an annular inner side wall 31 that is formed at a position slightly further inside than the outer periphery end of the lower end cap 4 in such a manner as to surround the central protruding portion 30, an annular outer side wall 32 that is formed at the outer periphery end of the lower end cap 4 in such a manner as to surround the inner side wall 31 with a gap therebetween, and a liquid-discharge path 33 that is formed between the inner side wall 31 and the outer side wall 32.

The central protruding portion 30, the inner side wall 31, and the outer wall 32 extend parallel to the axis L toward the upper side of the filter element 1, that is, toward the upper end cap 3. A height H3 of the outer side wall 32 from a cap-inner-bottom surface 4a is larger than a height H4 of the inner side wall 31 from the cap-inner-bottom surface 4a and is the same as a height H5 of the central protruding portion 30 from the cap-inner-bottom surface 4a.

The outer peripheral surface of the inner side wall 31 and the inner peripheral surface of the outer side wall 32 are connected to each other by a plurality of rib-shaped connecting walls 34 that are radially arranged, and the liquid-discharge path 33 is formed between the adjacent connecting walls 34 and 34. Upper end surfaces of the connecting walls 34 are positioned at the same height as the upper end surface of the inner side wall 31 and are each in a horizontal position, and lower end surfaces of the connecting walls 34 are each formed as a curved surface that is curved upward.

The lower end portions of the inner-core member 11, the inner-filter member 12, and the outer-core member 13 of the filter assembly 2 are fitted into a liquid-storage chamber 35 that has an annular shape and that is surrounded by the central protruding portion 30 and the inner side wall 31. The lower end portions are in contact with the flat cap-inner-bottom surface 4a of the liquid-storage chamber 35, and the cap-inner-bottom surface 4a is bonded to the lower end portion of the filter assembly 2 with the adhesive 5 with which the liquid-storage chamber 35 is filled.

The outer periphery of a lower end portion of the inner-filter member 12 is surrounded by the inner side wall 31 with the outer-core member 13 interposed therebetween. Thus, the lower end portions of the inner-core member 11, the inner-filter member 12, and the outer-core member 13 are located on the same plane that is perpendicular to the axis L.

In contrast, a lower end portion of the outer-filter member 14 is located at a position above the lower end portion of the inner-filter member 12 and is disposed so as to be in contact with an upper end surface of the inner side wall 31 and with upper end surfaces of the connecting walls 34 or so as to be positioned in the vicinity of the upper end surface of the inner side wall 31 and the upper end surfaces of the connecting walls 34 with a small gap therebetween. The outer periphery of the lower end portion of the outer-filter member 14 is surrounded by the outer side wall 32.

A gap 36 is formed between the outer periphery of the lower end portion of the outer-filter member 14 and the inner periphery of the outer side wall 32, and the gap 36 is in communication with the liquid-discharge path 33.

Similar to the upper end cap 3, the lower end cap 4 serves to prevent a liquid that has been separated from compressed air from being dispersed again into the compressed air, and the operation of the lower end cap 4 is as follows.

That is to say, liquid that is collected by the inner-filter member 12 and the outer-filter member 14 during the period when compressed air that has been introduced into the central space portion 10 passes from the inner-filter member 12 toward the outer-filter member 14 is in the form of fine particles first and gradually agglomerate into larger particles. Accordingly, the liquid flows down along the inner-filter member 12 and the outer-filter member 14 by the action of gravity, and the particles become larger liquid particles as a result of being bonded to one another while flowing down and reach the lower end cap 4.

Then, the liquid that has flowed down along the inner-filter member 12 temporarily stays in the liquid-storage chamber 35 of the lower end cap 4. After that, the liquid is caused to gradually overflow the inner side wall 31 by the subsequent liquid flow and falls in drops from the liquid-discharge path 33 to the outside. The liquid that has flowed down along the outer-filter member 14 also falls in drops from the liquid-discharge path 33 to the outside.

In this case, the compressed air flows from the central space portion 10 through the inner-filter member 12 and the outer-filter member 14, and part of the compressed air that flows in the vicinity of the lower end portions of the inner-filter member 12 and the outer-filter member 14 is interrupted by the outer side wall 32 of the lower end cap 4, so that the flow velocity of the compressed air at the outer side wall 32 is reduced. As a result, the liquid that is collected in the liquid-storage chamber 35 of the lower end cap 4, the liquid that overflows the inner side wall 31, or the liquid that is densely included in portions in the vicinity of the lower end portions of the inner-filter member 12 and the outer-filter member 14 is prevented from being dispersed by the flow of the compressed air, and thus, the liquid separated from the compressed air will not be mixed again into the compressed air that has been purified.

In the above-described embodiment, as is clear from FIGS. 5(a) and 5(b), although the intermediate wall 21 of the upper end cap 3 is formed so as to be continuous along the whole periphery of the annular shape and so as to have the uniform height H1, the shape of the intermediate wall 21 is not limited to such a shape and may be any one of the following various shapes.

Figure 8:
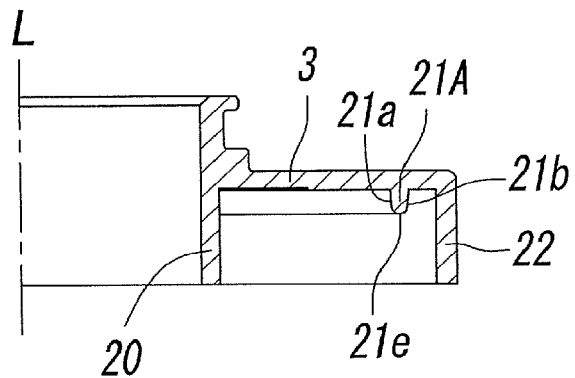
FIG. 8 is an enlarged sectional view of a principal portion that illustrates a modification of the upper end cap.

An intermediate wall 21A illustrated in FIG. 8 is formed of the inner side surface 21a, which is parallel to the axis L, the outer surface 21b, which is parallel to the axis L, and a lower end surface 21e having an arc shape and has a uniform thickness over the entire height thereof. The lower end surface 21e can be formed as a flat surface that is perpendicular to the axis L.

Figure 9:
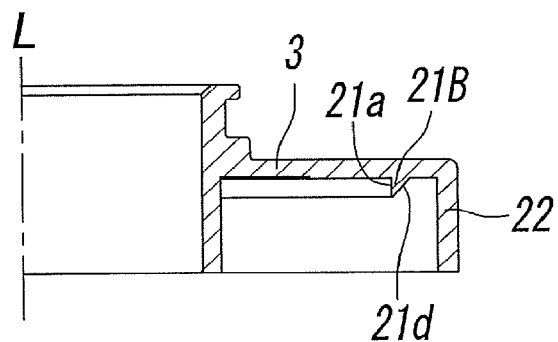
FIG. 9 is an enlarged sectional view of the principal portion that illustrates another modification of the upper end cap.

The difference between an intermediate wall 21B illustrated in FIG. 9 and the intermediate wall 21A illustrated in FIG. 8 is that the intermediate wall 21B is formed in a shape having a sharp lower end by the inner side surface 21a that is parallel to the axis L and the outer inclined surface 21d that is inclined in a direction in which the thickness of the intermediate wall 21B decreases toward the lower end of the intermediate wall 21B. The difference between an intermediate wall 21C illustrated in FIG. 10 and the intermediate wall 21A illustrated in FIG. 8 is that the intermediate wall 21C is formed so as to have a height difference (irregularities) by alternately forming wall portions 21f each having a large height and wall portions 21g each having a small height in the circumferential direction.

Figure 11:
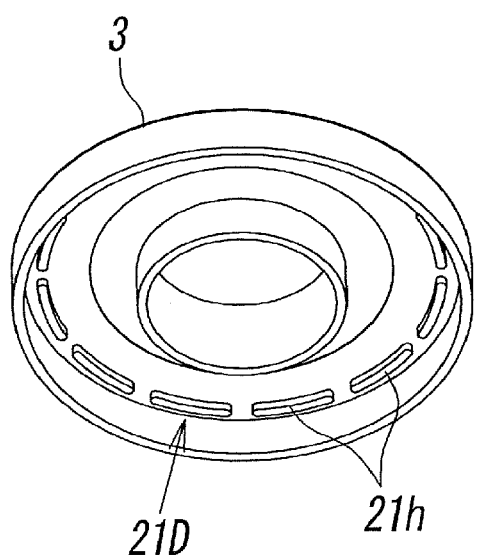
FIG. 11 is a perspective view illustrating another modification of the upper end cap.
Figure 12:
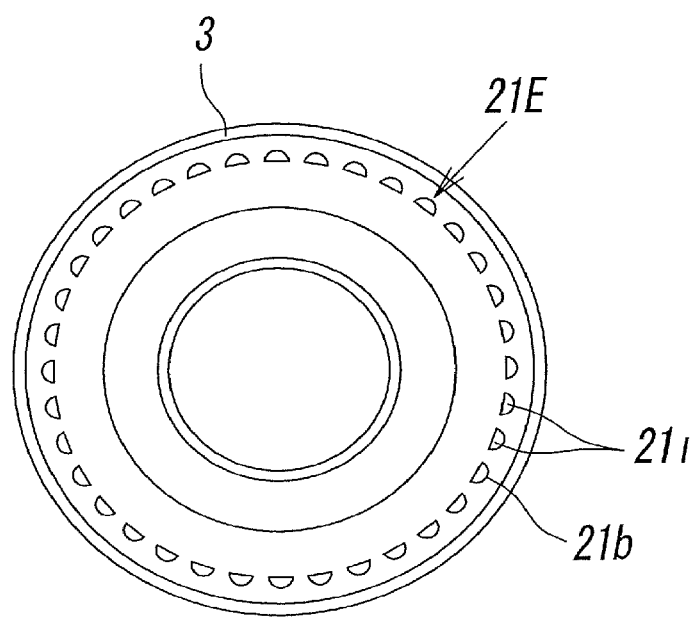
FIG. 12 is a bottom view illustrating another modification of the upper end cap.

The difference between an intermediate wall 21D illustrated in FIG. 11 and the intermediate wall 21A illustrated in FIG. 8 is that the intermediate wall 21D is formed in a discontinuous state by arranging a plurality of wall portions 21h each of which is curved in an arc shape such that the plurality of wall portions 21h are spaced apart from one another in the circumferential direction. The difference between an intermediate wall 21E illustrated in FIG. 12 and the intermediate wall 21D illustrated in FIG. 11 is that wall portions 21i each have a length smaller than the length of each of the wall portions 21h of the intermediate wall 21D illustrated in FIG. 11 and that the outer surface 21b of each of the wall portions 21i is an arc-shaped surface. Note that each of the wall portions 21h of the intermediate wall 21D illustrated in FIG. 11 may have a linear shape, and the lower end surface of each of the wall portions 21h may be an arc-shaped surface or may be a flat surface.

In addition, the difference between an intermediate wall 21F illustrated in FIGS. 13(a) and 13(b) and the intermediate wall 21A illustrated in FIG. 8 is that the intermediate wall 21F has a double structure by disposing an inner annular wall 21j having a smaller diameter and an outer annular wall 21k having a larger diameter such that the inner annular wall 21j and the outer annular wall 21k are concentric with each other. In this case, the height of the inner annular wall 21j and the height of the outer annular wall 21k may be different from each other. Alternatively, either or both of the inner annular wall 21j and the outer annular wall 21k can be formed so as to have a shape the same as that of one of the intermediate walls 21A to 21E illustrated in FIGS. 8 to 12, and in the case where each of the inner annular wall 21j and the outer annular wall 21k is formed so as to have a shape the same as that of one of the intermediate walls 21A to 21E illustrated in FIGS. 8 to 12, the shape of the inner annular wall 21j and the shape of the outer annular wall 21k can be different from each other.

Figure 14:
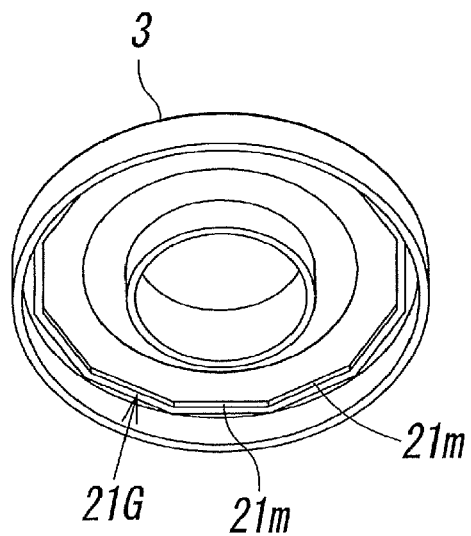
FIG. 14 is a perspective view illustrating another modification of the upper end cap.

In addition, the difference between an intermediate wall 21G illustrated in FIG. 14 and the intermediate wall 21A illustrated in FIG. 8 is that the intermediate wall 21G is formed in a polygonal shape by connecting a plurality of linear wall portions 21m to one another.

Figure 5:
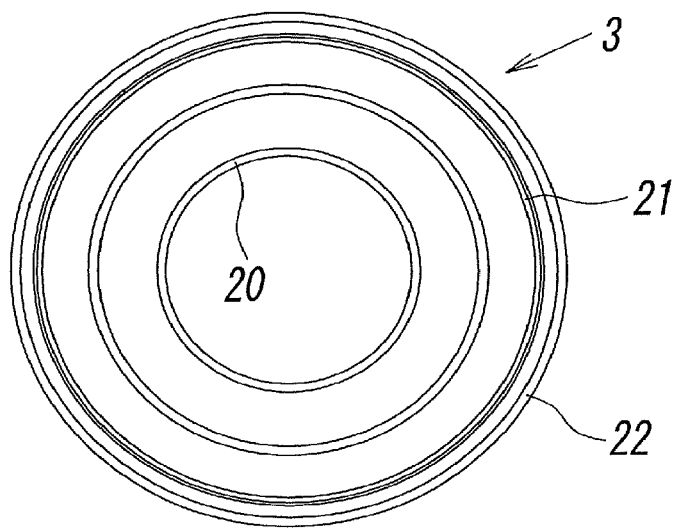
FIG. 5(a) is a bottom view of an upper end cap.
FIG. 5(b) is a partial sectional-view of the same.
Figure 5:
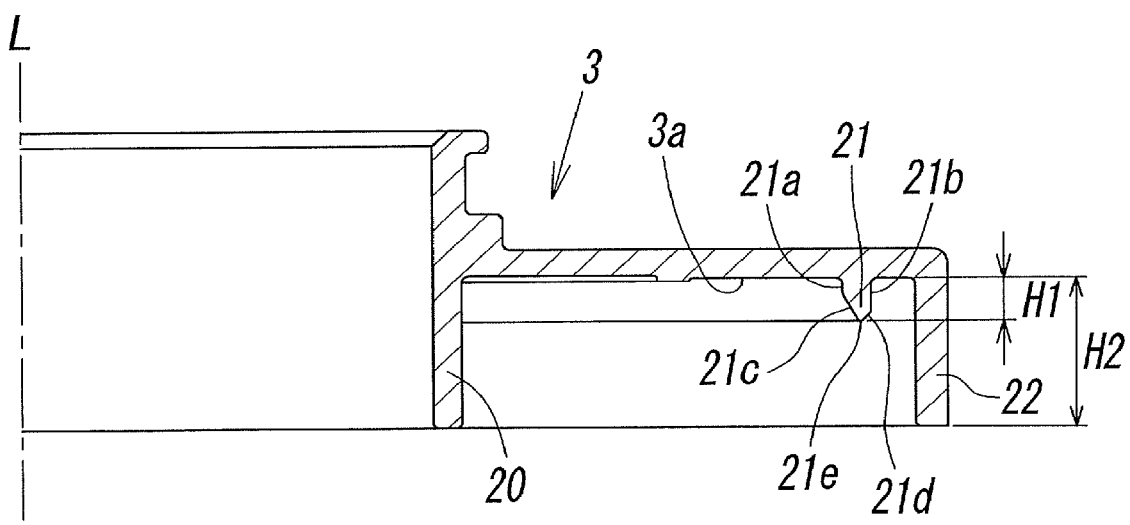
Figure 10:
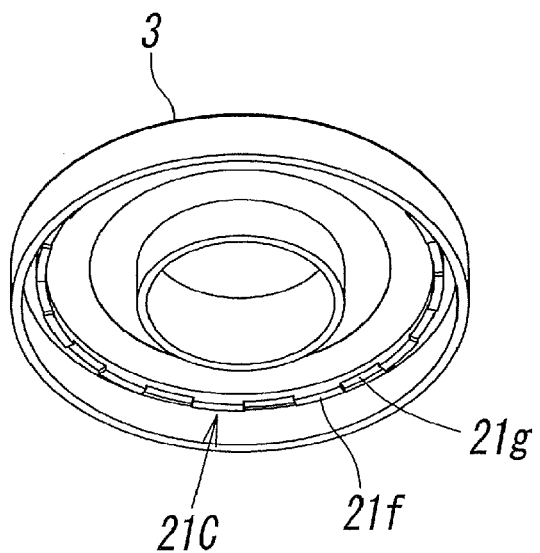
FIG. 10 is a perspective view illustrating another modification of the upper end cap.
Figure 13:
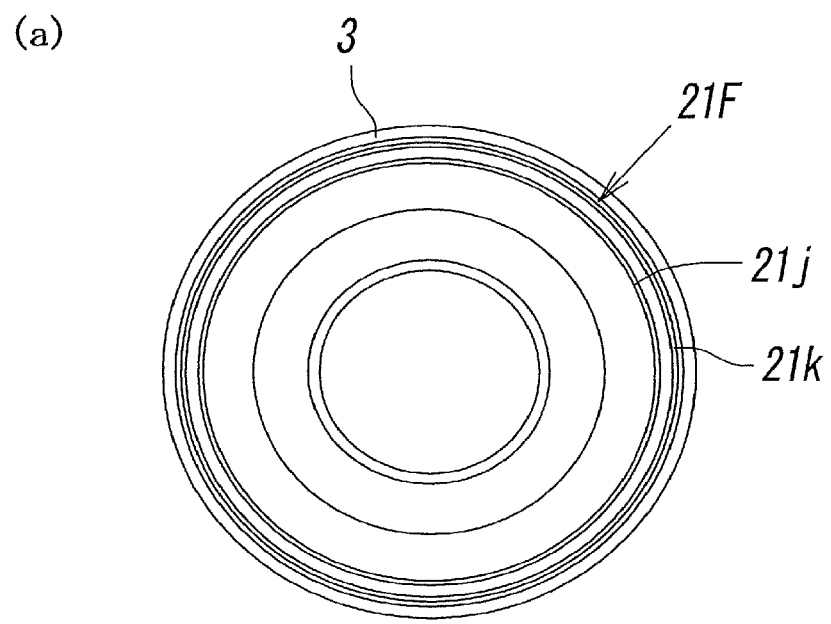
FIG. 13 are diagrams illustrating another modification of the upper end cap.
Figure 13:
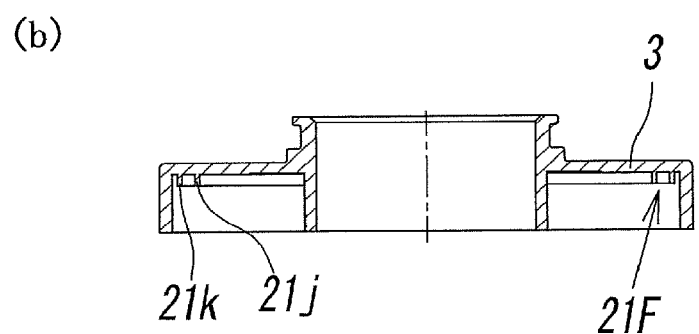

Note that the intermediate wall 21C illustrated in FIG. 10, the intermediate wall 21D illustrated in FIG. 11, the intermediate wall 21F illustrated in FIG. 13, and the intermediate wall 21G illustrated in FIG. 14 can have a cross-sectional shape that is the same as the cross-sectional shape of the intermediate wall 21 illustrated in FIG. 5.

Figure 15:
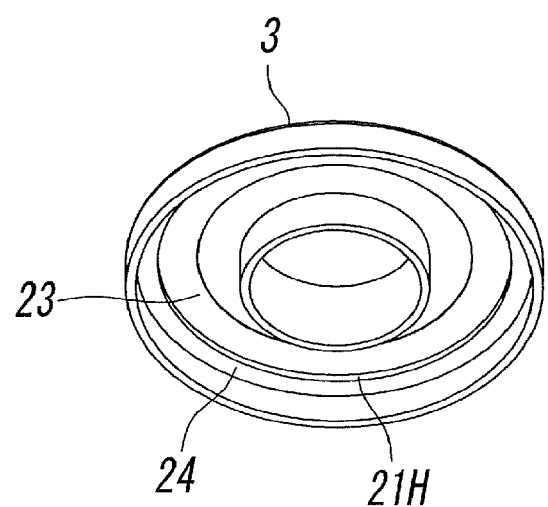
FIG. 15 are diagrams illustrating another modification of the upper end cap.
Figure 15:
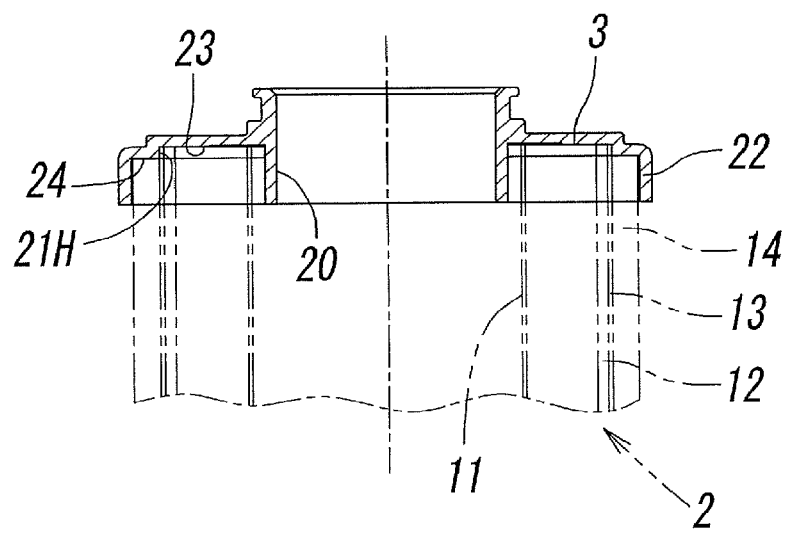
Figure 16:
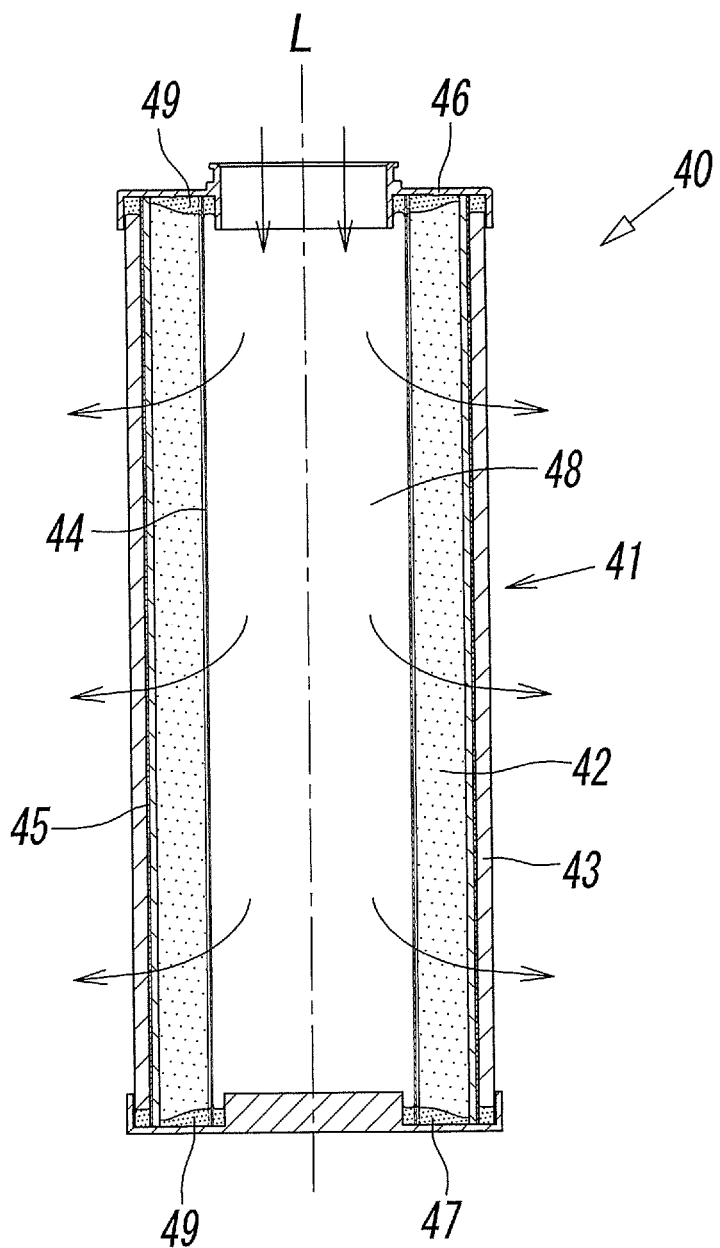
FIG. 16 is a longitudinal sectional view of a filter element of the related art.
Figure 17:
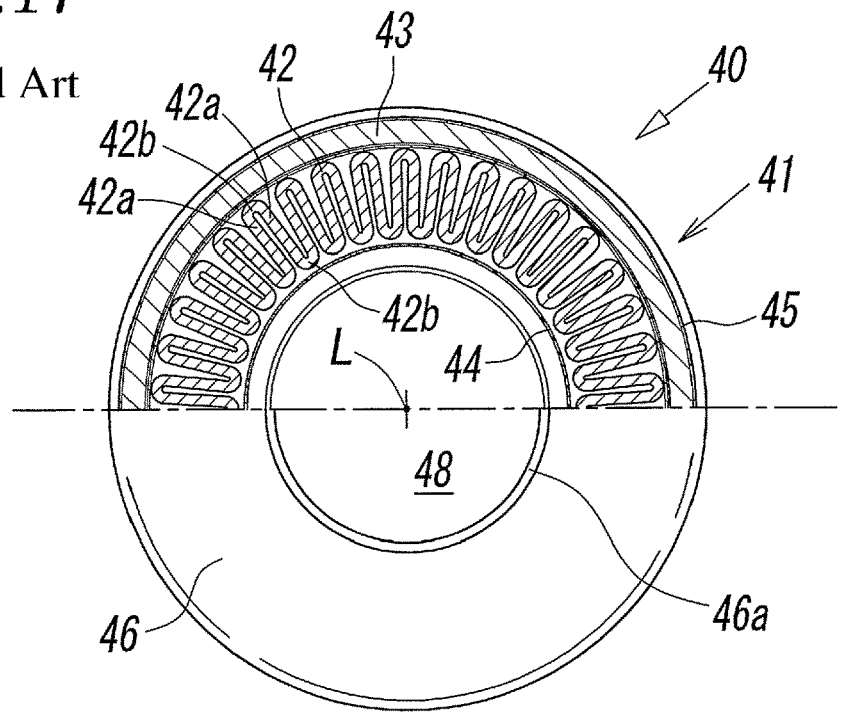
FIG. 17 is a transverse sectional view of the filter element of the related art.
Figure 18:
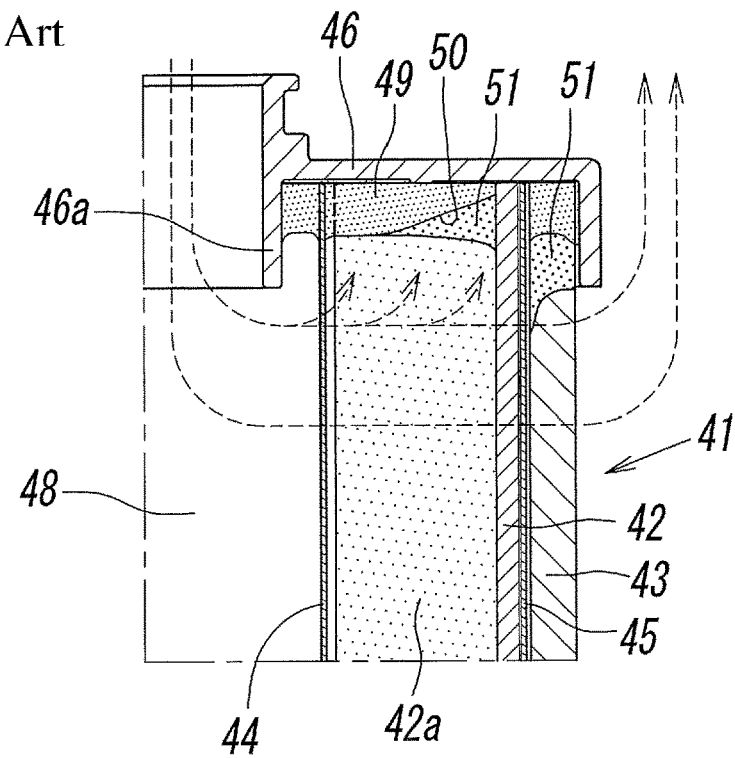
FIG. 18 is a partially enlarged view of the right half of an upper end portion of the filter element illustrated in FIG. 16.
Figure 19:
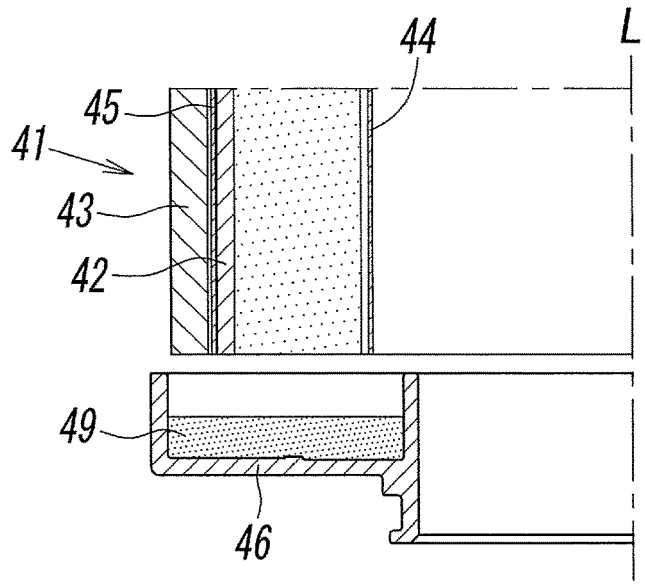
FIG. 19 are sectional views of a principal portion that illustrate a process of bonding an upper end cap to the filter element of the related art with an adhesive.
Figure 19:
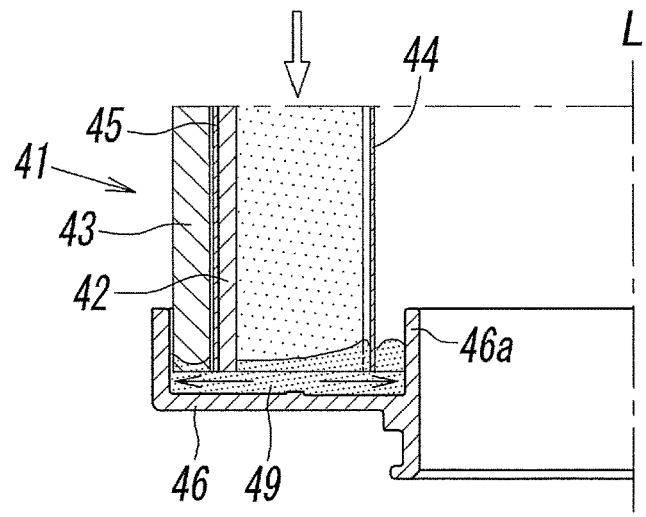
Figure 19:
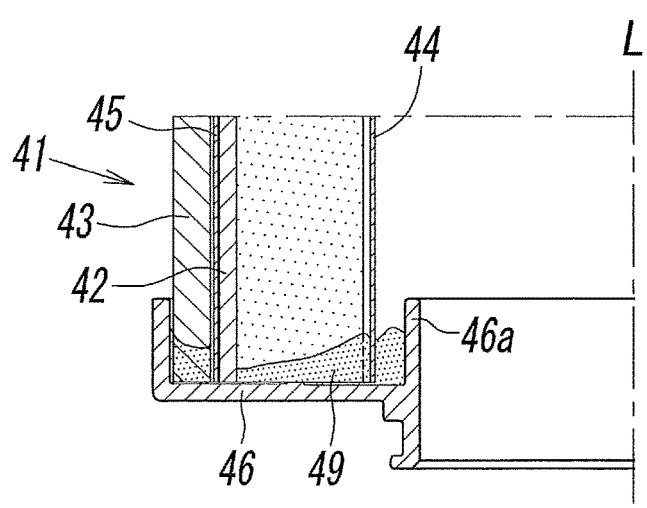

In addition, in FIGS. 15(a) and 15(b), an annular recess 23 that surrounds the inner peripheral wall 20 is formed in the upper end cap 3, and a side wall of the recess 23 that is located on the outer diameter side serves as an intermediate wall 21H. The filter assembly 2 having the upper end to which the upper end cap 3 is to be bonded is formed such that the upper end portion of the outer-filter member 14 is occupies a position lower than the upper end portions of the inner-core member 11, the inner-filter member 12, and the outer-core member 13, so that the upper end portions of the members 11 to 13 are fitted into the recess 23 and that the upper end portion of the outer-filter member 14 is in contact with a protruding portion 24 surrounding the recess 23.

Note that, also in filter elements that use the upper end caps illustrated in FIG. 5 and FIG. 8 to FIG. 15, the upper end portion of the outer-filter member 14 may be brought into contact with the intermediate wall 21 by forming the filter assembly 2 such that the upper end portion of the outer-filter member 14 occupies a position lower than the upper end portions the other members 11 to 13.

Note that, in the embodiment illustrated in the drawings, although the cross-sectional shape of the filter assembly 2, that is, the cross-sectional shapes of the inner-core member 11, the inner-filter member 12, the outer-core member 13, and the outer-filter member 14 are each a circular shape, the cross-sectional shape may be other than a circular shape. For example, the cross-sectional shape may be an elliptical shape or a polygonal shape, such as a quadrangular shape, a hexagonal shape, or an octagonal shape. In this case, the upper end cap 3 and the lower end cap 4 can also be formed into a shape similar to the above. In this case, it is obvious that each of the intermediate walls 21 and 21A to 21H of the upper end caps 3 is formed into a shape similar to the above.

In addition, in the embodiment illustrated in the drawings, a hollow prefilter that protects the inner-filter member 12 by removing beforehand relatively large dust and the like contained in compressed air can be disposed in a space enclosed by the inner-filter member 12 in the filter assembly 2. This prefilter may be disposed in a space enclosed by the inner-core member 11 or may be disposed outside the inner-core member 11.

Furthermore, in the above-described embodiment, the inner-filter member 12 is fine-meshed, and the outer-filter member 14 is large-meshed. However, conversely, the inner-filter member 12 may be large-meshed, and the outer-filter member 14 may be fine-meshed.

REFERENCE SIGNS LIST 1 filter element
2 filter assembly
3 upper end cap
4 lower end cap
5 adhesive
10 central space portion
11 inner-core member
12 inner-filter member
13 outer-core member
14 outer-filter member
20 inner peripheral wall
21, 21A to 21H intermediate wall
21h, 21i wall portion
21j, 21k annular wall
22 outer peripheral wall
L axis

The invention claimed is:

1. A filter element having a hollow shape and for removing dust and a liquid mixed in compressed air, the filter element comprising:
   a filter assembly that has a hollow shape;
   an upper end cap that is attached to an upper end of the filter assembly, which is one of ends of the filter assembly in an axial direction; and
   a lower end cap that is attached to a lower end of the filter assembly that is opposite to the upper end of the filter assembly, wherein the filter assembly includes
 a central space portion into which compressed air is introduced,
 a hollow inner-core member that has a porous structure and that surrounds the central space portion,
 a hollow inner-filter member that surrounds an outer periphery of the inner-core member,
 a hollow outer-core member that has a porous structure and that surrounds an outer periphery of the inner-filter member, and
 a hollow outer-filter member that surrounds an outer periphery of the outer-core member,
wherein the upper end cap includes
 a hollow inner peripheral wall that is fitted into an upper end portion of a central space portion,
 an intermediate wall that surrounds an outer periphery of an upper end portion of the outer-core member, and
 an outer peripheral wall that surrounds an outer periphery of an upper end portion of the outer-filter member, an inner peripheral wall, the intermediate wall, and the outer peripheral wall being arranged in this order in a direction from the center of the upper end cap toward an outer periphery of the upper end cap,
wherein a height of the intermediate wall is smaller than a height of the outer peripheral wall and a height of the inner peripheral wall,
wherein the inside of the upper end cap is filled with an adhesive having a depth that enables the intermediate wall to be embedded in the adhesive, and
wherein the filter assembly and the upper end cap are bonded to each other by the adhesive in a state where an upper end portion of the filter assembly is inserted in the adhesive and the intermediate wall enters into the outer-filter member around the outer-core member.

2. The filter element according to claim 1, wherein the intermediate wall is formed at a position between the outer peripheral wall and an intermediate position between the inner peripheral wall and the outer peripheral wall.

3. The filter element according to claim 1, wherein the height of the intermediate wall is half of the height of the outer peripheral wall or smaller.

4. The filter element according to claim 1, wherein a lower end portion of the intermediate wall is located at a position lower than at least an upper end portion of the inner-core member, an upper end portion of the inner-filter member, and the upper end portion of the outer-core member among the inner-core member, the inner-filter member, the outer-core member, and the outer-filter member of the filter assembly.

5. The filter element according to claim 1, wherein the inner-filter member is folded in a pleated manner.

6. The filter element according to claim 1, wherein the intermediate wall is continuous along a whole periphery.

7. The filter element according to claim 1, wherein the intermediate wall is formed in a discontinuous state by arranging a plurality of wall portions such that the plurality of wall portions are spaced apart from one another.

8. The filter element according to claim 1, wherein the intermediate wall is formed of a plurality of annular walls having different diameters so as to have a multiple structure.

* * * * *